(12) United States Patent
Webb et al.

(10) Patent No.: US 8,829,152 B2
(45) Date of Patent: Sep. 9, 2014

(54) METHODS FOR PREPARATION OF MACROCYCLIC POLYESTER OLIGOMER VIA HETEROGENEOUS CATALYSIS

(75) Inventors: Jimmy Lynn Webb, Ballston Lake, NY (US); James Mihalich, Shrewsbury, MA (US)

(73) Assignee: Liquid Thermo Plastics, Inc., Milwaukee, WI (US)

( * ) Notice: Subject to any disclaimer, the term of this patent is extended or adjusted under 35 U.S.C. 154(b) by 0 days.

(21) Appl. No.: 13/403,608

(22) Filed: Feb. 23, 2012

(65) Prior Publication Data

US 2012/0302721 A1     Nov. 29, 2012

Related U.S. Application Data

(60) Provisional application No. 61/445,891, filed on Feb. 23, 2011.

(51) Int. Cl.
*C08G 63/00* (2006.01)
*C08G 63/02* (2006.01)

(52) U.S. Cl.
USPC ........ 528/272; 528/274; 528/275; 528/308.3; 528/308.6

(58) Field of Classification Search
CPC ........................................................ C08G 2/08
USPC ..................... 528/272, 274, 275, 308.3, 308.6
See application file for complete search history.

(56) References Cited

U.S. PATENT DOCUMENTS

| | | | |
|---|---|---|---|
| 3,817,931 A * | 6/1974 | Brooks ........................ | 528/275 |
| 5,039,783 A | 8/1991 | Brunelle et al. | |
| 5,231,161 A | 7/1993 | Brunelle et al. | |
| 5,407,984 A | 4/1995 | Brunelle et al. | |
| 5,668,186 A | 9/1997 | Brunelle et al. | |
| 6,525,164 B2 | 2/2003 | Faler | |
| 6,787,632 B2 | 9/2004 | Phelps et al. | |
| 7,022,806 B2 * | 4/2006 | Faler ............................ | 528/279 |
| 7,550,109 B2 * | 6/2009 | Lee ............................... | 266/270 |
| 7,732,557 B2 | 6/2010 | Phelps et al. | |
| 7,750,109 B2 | 7/2010 | Phelps et al. | |
| 7,767,781 B2 | 8/2010 | Phelps et al. | |
| 8,283,437 B2 | 10/2012 | Phelps et al. | |
| 2006/0079395 A1 | 4/2006 | Wiegner et al. | |

FOREIGN PATENT DOCUMENTS

| | | | |
|---|---|---|---|
| FR | 2769521 A1 | | 4/1999 |
| GB | 2333525 | * | 7/1999 |
| WO | WO-2006104821 A1 | | 10/2006 |

OTHER PUBLICATIONS

Burch Macromolecules 2000, p. 5053.*
International Search Report for PCT/US2012/026323 mailed May 31, 2012.

* cited by examiner

*Primary Examiner* — Terressa Boykin
(74) *Attorney, Agent, or Firm* — Choate, Hall & Stewart LLP

(57) ABSTRACT

The invention relates to methods and systems for preparing macrocyclic polyester oligomer (MPO) directly from monomer via heterogeneous catalysis, rather than by depolymerizing a polyester. For example, in an exemplary embodiment, cyclic poly(butylene terephthalate) (cPBT) is produced by reacting butanediol (BDO) and dimethylterephthalate (DMT) in an organic solvent—for example, ortho-dichlorobenzene (oDCB). The mixture flows over (or otherwise contacts) the catalyst-coated fiberglass or silica gel, e.g., which is packed in a column or bed. MPO is produced in the reaction mixture, while residual linears and catalyst residue remain in the column/bed.

18 Claims, 15 Drawing Sheets

US 8,829,152 B2

METHODS FOR PREPARATION OF MACROCYCLIC POLYESTER OLIGOMER VIA HETEROGENEOUS CATALYSIS

RELATED APPLICATION

This application claims priority to and the benefit of U.S. provisional patent application Ser. No. 61/445,891, filed Feb. 23, 2011, the disclosure of which is incorporated herein by reference in its entirety.

FIELD OF THE INVENTION

This invention relates generally to methods for preparing macrocyclic polyester oligomer (MPO). More particularly, in certain embodiments, the invention relates to methods for preparing macrocyclic polyester oligomer using a solid catalyst.

BACKGROUND OF THE INVENTION

Macrocyclic polyester oligomers (MPOs) have unique properties that make them attractive as matrix-forming resins for engineering thermoplastic composites. MPOs lend valuable characteristics to polymerized products, for example, high strength, high gloss, and solvent resistance. Furthermore, because certain MPOs melt and polymerize at temperatures well below the melting point of the resulting polymer, polymerization and crystallization can occur virtually isothermally upon melting of the MPO in the presence of an appropriate catalyst. The time and expense required to thermally cycle a tool is favorably reduced, because demolding can take place immediately following polymerization, without first cooling the mold.

Various methods for preparing MPO by depolymerizing polyesters have been described. For example, polybutylene terephthalate (PBT) and other polyalkylene terephthalates may be depolymerized to form macrocyclic polyester oligomers (MPOs), including, for example, the cyclic form of poly(1,4-butylene terephthalate) (cPBT). See, e.g., co-owned U.S. Pat. No. 5,039,783 by Brunelle et al., U.S. Pat. No. 5,231,161 by Brunelle et al., U.S. Pat. No. 5,407,984 by Brunelle et al., U.S. Pat. No. 5,668,186 by Brunelle et al., U.S. Pat. No. 6,525,164, by Faler, U.S. Pat. No. 6,787,632 by Phelps et al.; U.S. Pat. No. 7,732,557 by Phelps et al.; U.S. Pat. No. 7,750,109 by Phelps et al.; and U.S. Pat. No. 7,767,781 Phelps et al.; the texts of which are all incorporated by reference herein in their entirety.

The depolymerization reaction is an equilibrium reaction that progresses relatively slowly and produces undesired byproducts, including hydroxybutylester linear oligomers (referred to herein as "linears"), which must be separated from the product stream, or recycled. These byproducts are typically gellular in nature, and are physically difficult to filter or otherwise remove from solution. Furthermore, the above depolymerization methods require precipitation and removal of catalyst residue from the reaction solution. The separation, extraction, and/or recycle of linears and/or catalyst residue necessitate added process steps and unit operations in the manufacture of MPOs, thereby increasing both capital expense and operating costs.

Thus, there is a need for a faster, more efficient, less costly method of manufacturing MPO.

SUMMARY OF THE INVENTION

The invention relates to methods and systems for preparing macrocyclic polyester oligomer (MPO) directly from monomer, rather than by depolymerizing a polyester. Heterogeneous catalysis is used instead of performing a depolymerization reaction in solution. For example, in certain embodiments, the method makes use of fiberglass coated with a titanium catalyst, over which a reaction solution passes. In other embodiments, catalyst-coated silica gel may be used, or another catalyst-coated (or otherwise catalyst-containing) solid, e.g., in a packed bed or column, may be used. The result is a much simpler, more efficient method of manufacturing MPOs that produces a substantially pure MPO product stream, where linear byproducts and catalyst residue are trapped on/in the solid (e.g., in the packed bed or column).

For example, in an exemplary embodiment, cyclic poly(butylene terephthalate) (cPBT) is prepared via heterogeneous catalysis by reacting butanediol (BDO) and dimethylterephthalate (DMT) in an organic solvent—for example, ortho-dichlorobenzene (oDCB). The reactants come into contact with a catalyst-containing solid, for example, a titanium catalyst-coated fiberglass, silica gel, or magnetic iron oxide. The catalyst-containing solid may be packed in a column or bed, or may be loose in the reaction vessel. Vapor purge is conducted to remove methanol. MPO is produced in the reaction mixture, while residual linears and catalyst residue remain in the column/bed of fiberglass or silica gel, thereby obviating or at least reducing the filtration required for separating out the MPO produced.

Embodiments of the invention also offer the ability to use lower catalyst concentrations in the preparation of cPBT and other MPOs. The use of less catalyst offers a cost savings, as well as other benefits. The use of lower catalyst concentrations may lower the amount of residual oligomers (i.e. non-MPO, hydroxyl- and/or acid-capped linears) formed and improve efficiency of MPO production. This may result in a lower level of residual acids in the column, and the period of time in which column packing becomes spent and needs to be replaced or recycled is longer. Furthermore, the residual oligomer filtrate may be less gellular and easier to remove from the column Embodiments of the invention may be performed as part of a continuous, semi-continuous, or batch process. Reactors may be single-stage or multi-stage. It is contemplated that methods of the invention may be combined or supplemented with reactors, systems, or processes that are known in the art.

Methods for the conversion of terephthalic acid (PTA) to DMT are known. Therefore, embodiments of the invention that employ DMT may alternatively employ PTA (purified or non-purified forms), for example, where DMT is formed from PTA. Similarly, the use of known chemical analogues and/or precursors of species described herein are considered to lie within the scope of the invention.

In one aspect, the invention relates to a method for preparing a macrocyclic polyester oligomer (MPO), the method comprising: heating a mixture, the mixture comprising a diol (e.g., butanediol), dimethylterephthalate (DMT) (or, alternatively or additionally, a DMT precursor such as TPA), and an organic solvent (e.g., ortho-dichlorobenzene (oDCB)); and contacting the mixture with a solid comprising a catalyst (e.g., titanium catalyst-coated fiberglass, titanium catalyst-coated silica gel, and/or titanium catalyst-adhered magnetic iron oxide—e.g., any of the foregoing packed in a bed or column or loose in a reactor vessel). In preferred embodiments, the method includes removing alcohol (e.g. methanol) produced (e.g., liberated) from the reaction mixture. In certain embodiments, the heating and the contacting are performed at the same time.

The MPO produced may be cPBT, cPPT, cPCT, cPET, cPEN, and/or copolymer oligomers thereof. The method may further include the step of collecting the MPO. In certain embodiments, the collected MPO is at least 80 wt. % dimer, trimer, tetramer, and/or pentamer species. In certain embodiments, the yield of MPO is at least 35%, at least 40%, at least 45%, or at least 50%. In certain embodiments, a recycle stream may be used to improve yield.

Various organic solvents may be used to practice the present invention. In some embodiments, the organic solvent includes at least one member selected from the group consisting of tetradecane, hexadecane, octadecane, toluene, xylene, trimethylbenzene, tetramethylbenzene, ethylbenzene, propylbenzene, naphthalene, methylnaphthalene, biphenyl, triphenyl, diphyenyl ether (or a halogenated derivative thereof), anisol, methylene chloride, dimethoxybenzene, chlorobenzene, dichlorobenzene, trichlorobenzene, chloronaphthalene, dichloronaphthalene, and/or a perfluorocarbon. In particular embodiments, the organic solvent includes ortho-xylene. In some embodiments, the organic solvent includes ortho-dichlorobenzene. In some embodiments, the organic solvent includes an alkane, such as tetradecane and hexadecane. In some embodiments, the organic solvent includes a perfluorocompound, such as perfluoro(tri-n-butylamine) and perfluoro(tri-n-pentylamine). The organic solvent used preferably has a boiling point no less than about 110° C.

Suitable catalysts that may be used to practice the present invention include, but are not limited to, various organotitanate and organotin compounds. In some embodiments, the catalyst includes at least one member selected from the group consisting of 2-ethylhexyl titanate, tetrakis-(2-ethylhexyl) titanate, tetrabutyl titanate, tetraisopropyl titanate, an alkoxy titanate, titanium methoxide, titanium ethoxide, diisopropoxide bis(2,4-pentanedionate), and butanediol titanate. In particular embodiments, the catalyst includes tetraisopropyl titanate.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DESCRIPTION OF THE ILLUSTRATIVE EMBODIMENT

Figure 1:
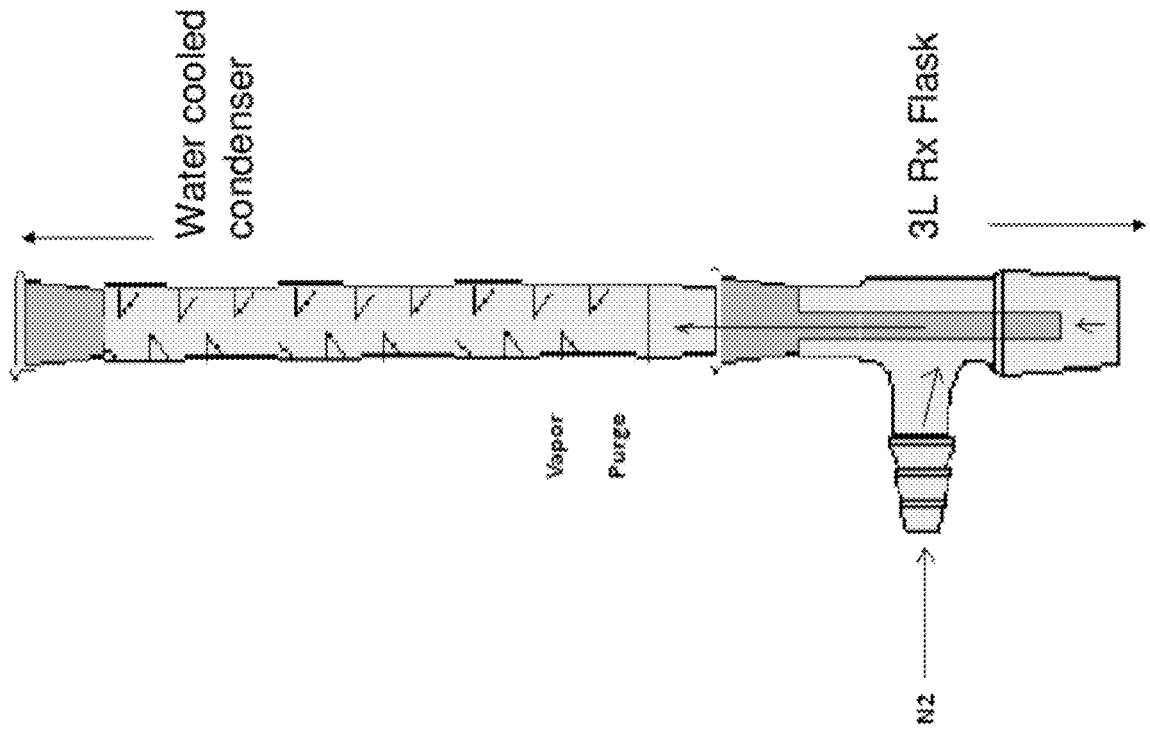
FIG. 1 is a schematic drawing of a Dean Stark trap and Vigreux column used in an illustrative experiment demonstrating preparation of MPO directly from monomer via heterogeneous catalysis, according to an illustrative embodiment of the invention.
Figure 2:
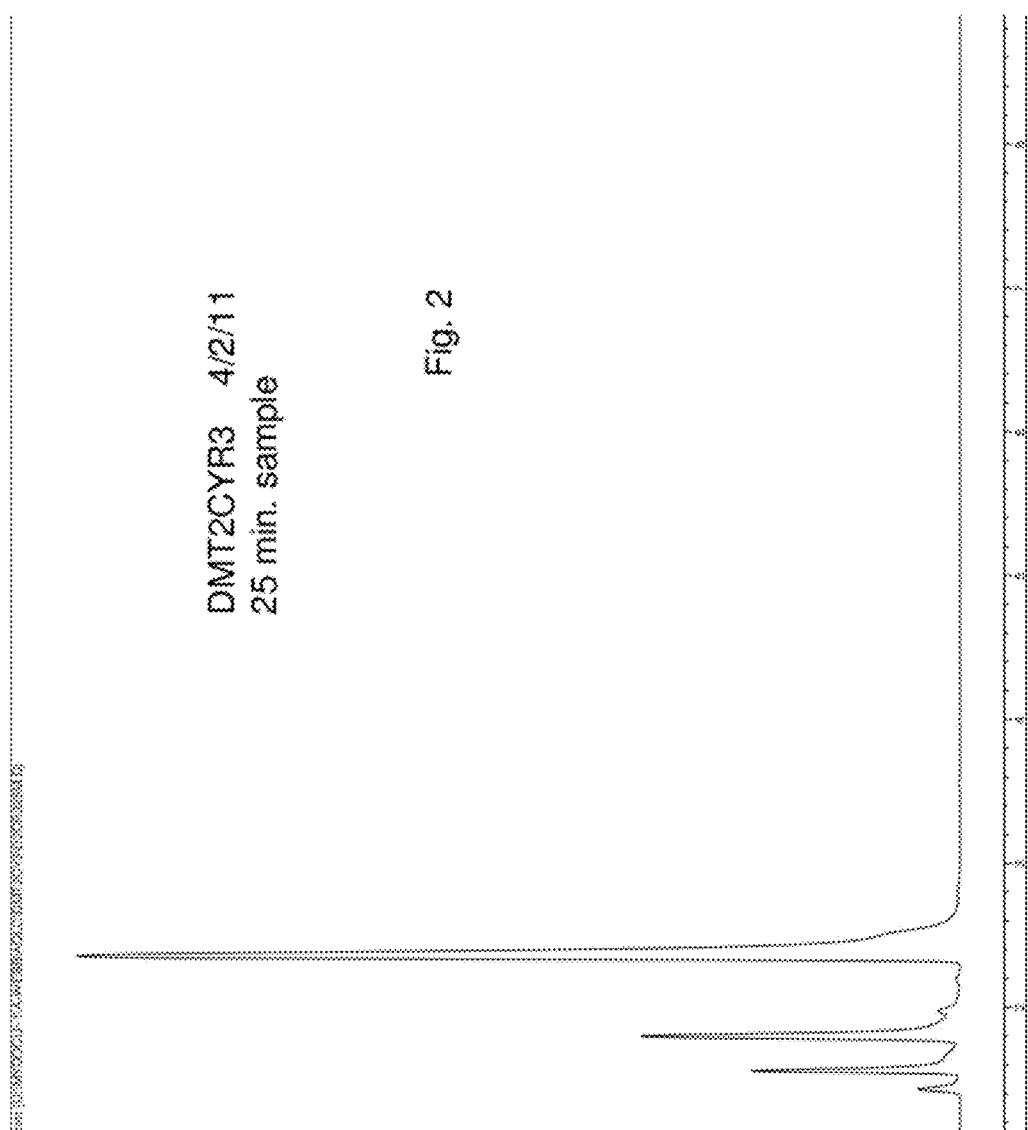
FIGS. 2-12 show chromatograms from the HPLC analysis of a solution in an experiment demonstrating preparation of MPO directly from monomer via heterogeneous catalysis, according to an illustrative embodiment of the invention.
Figure 3:
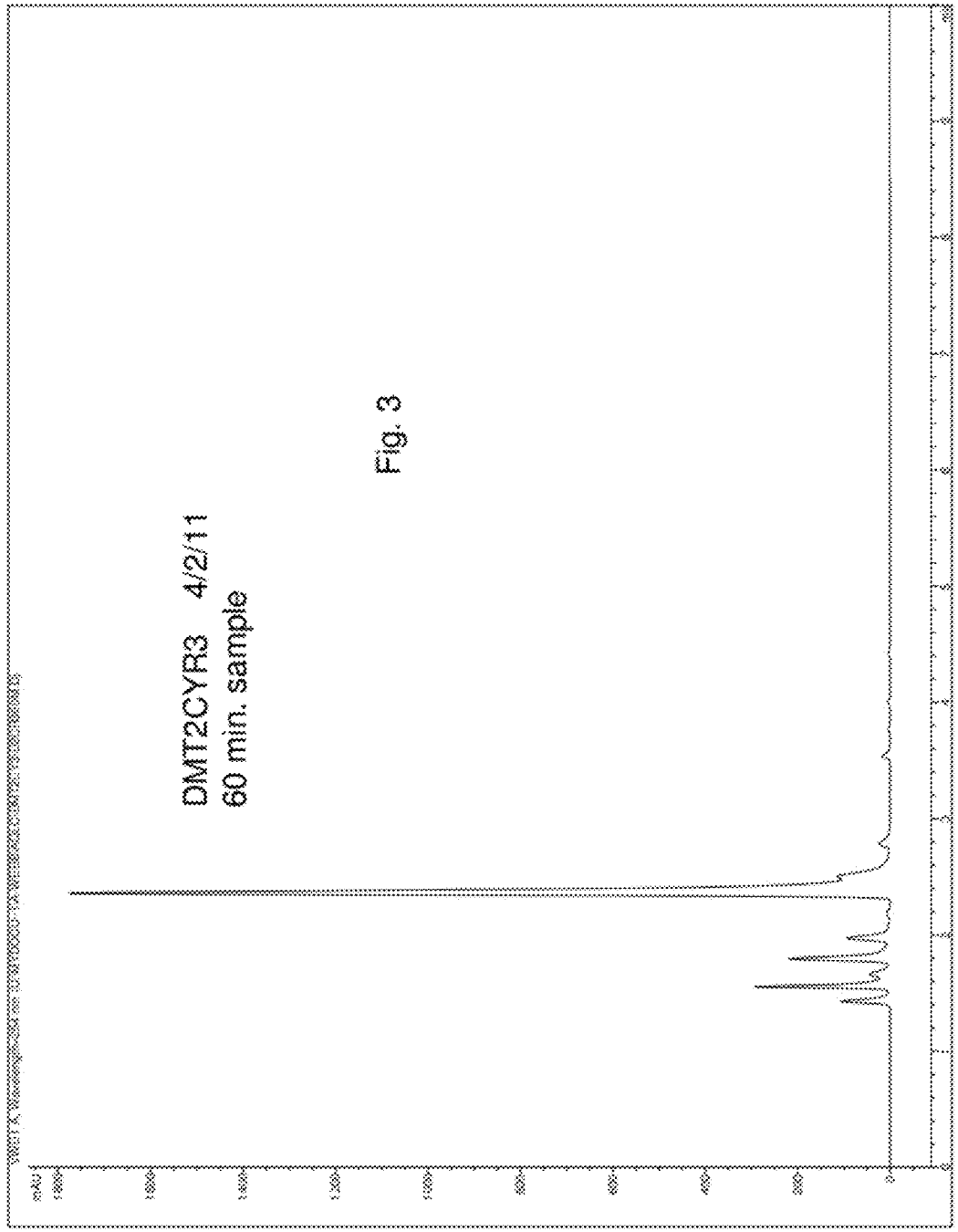
Figure 4:
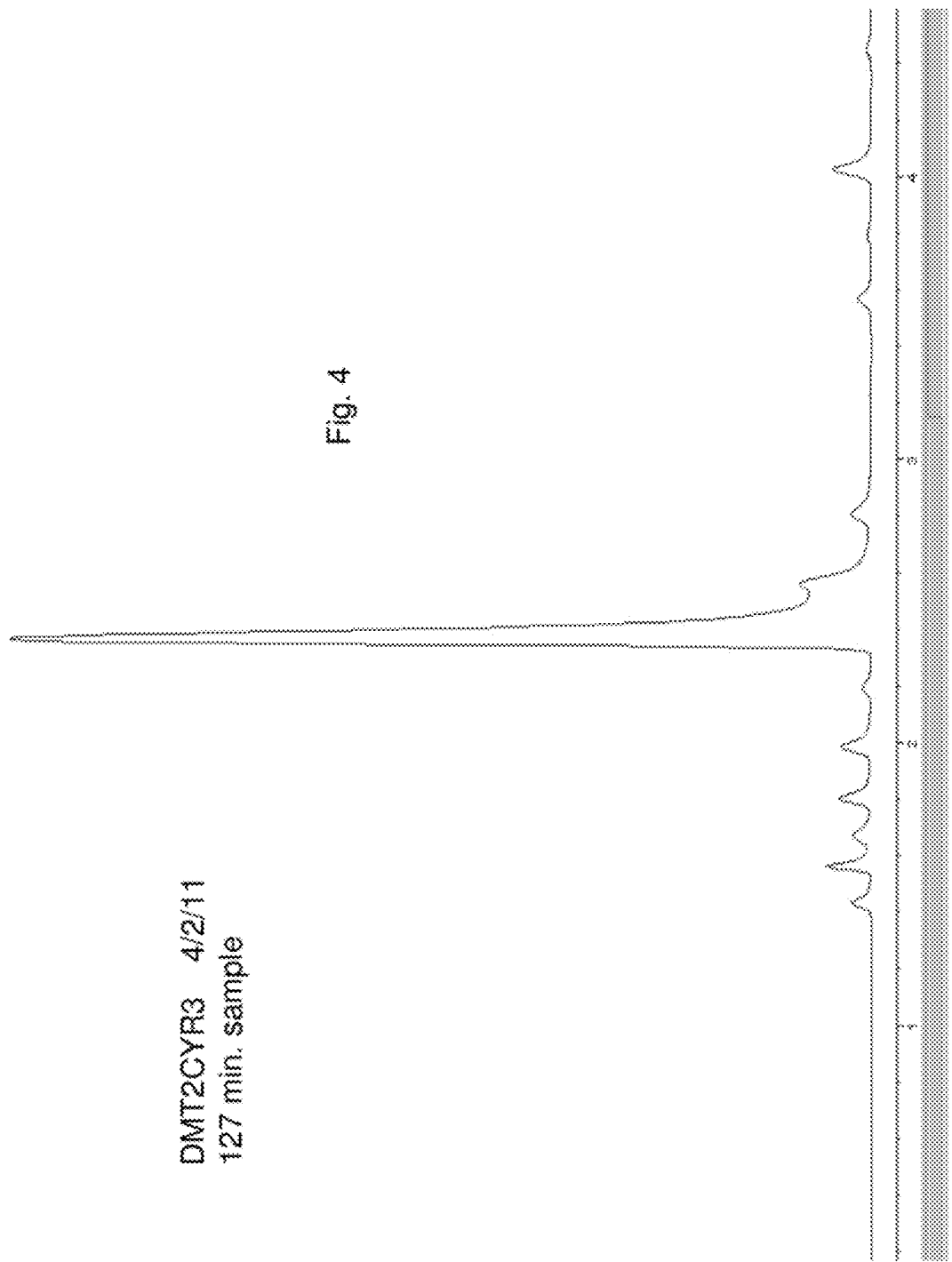
Figure 5:
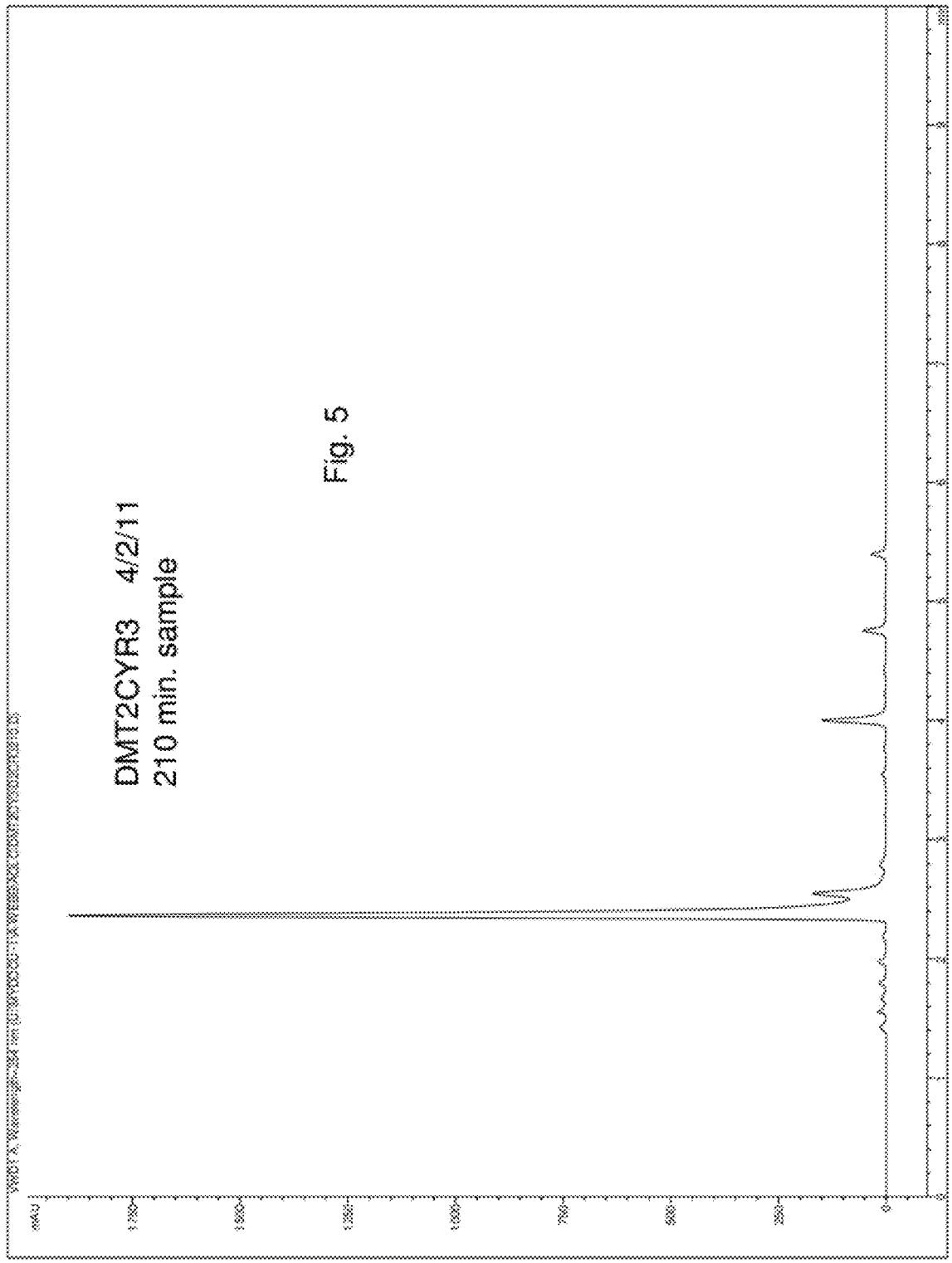
Figure 6:
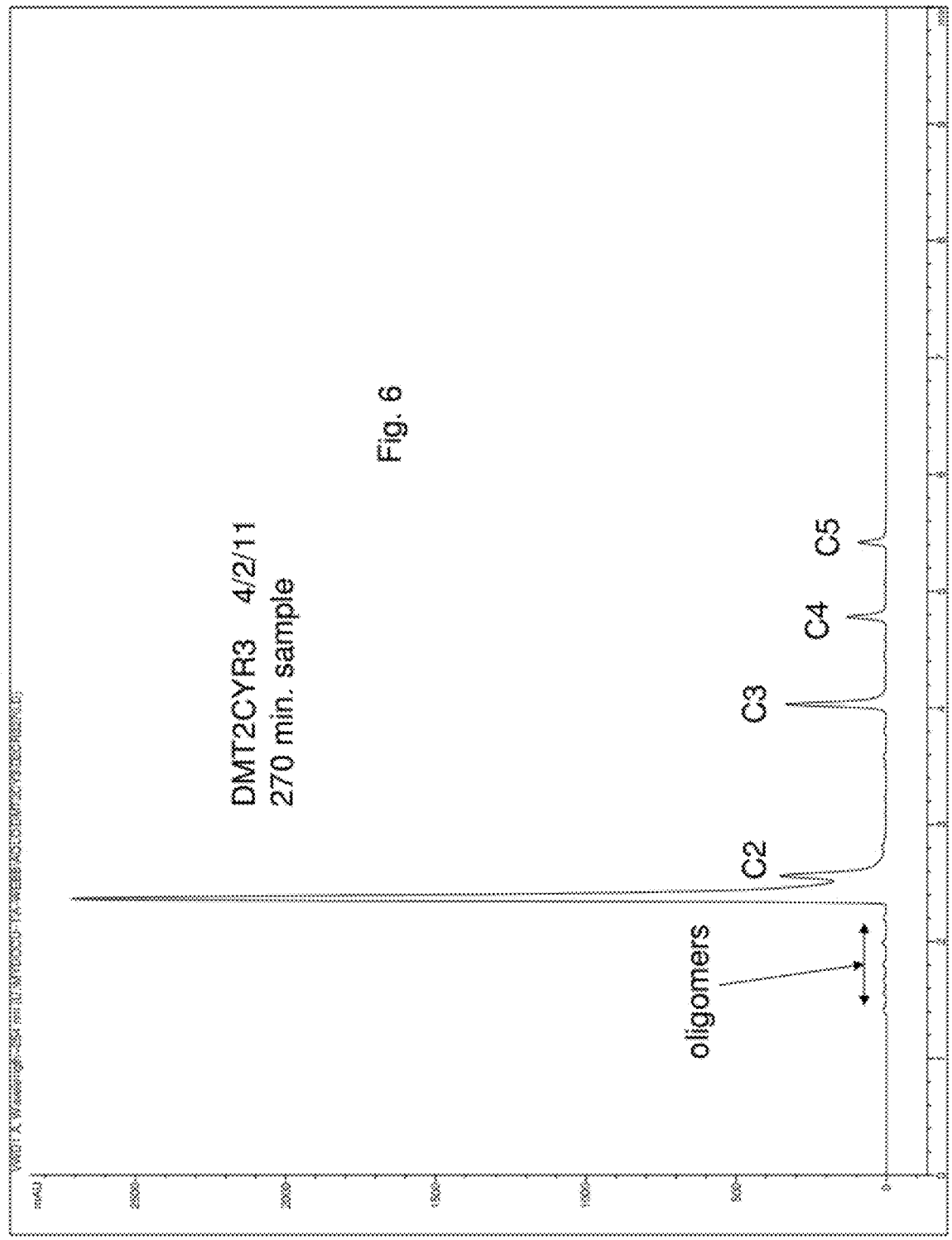
Figure 7:
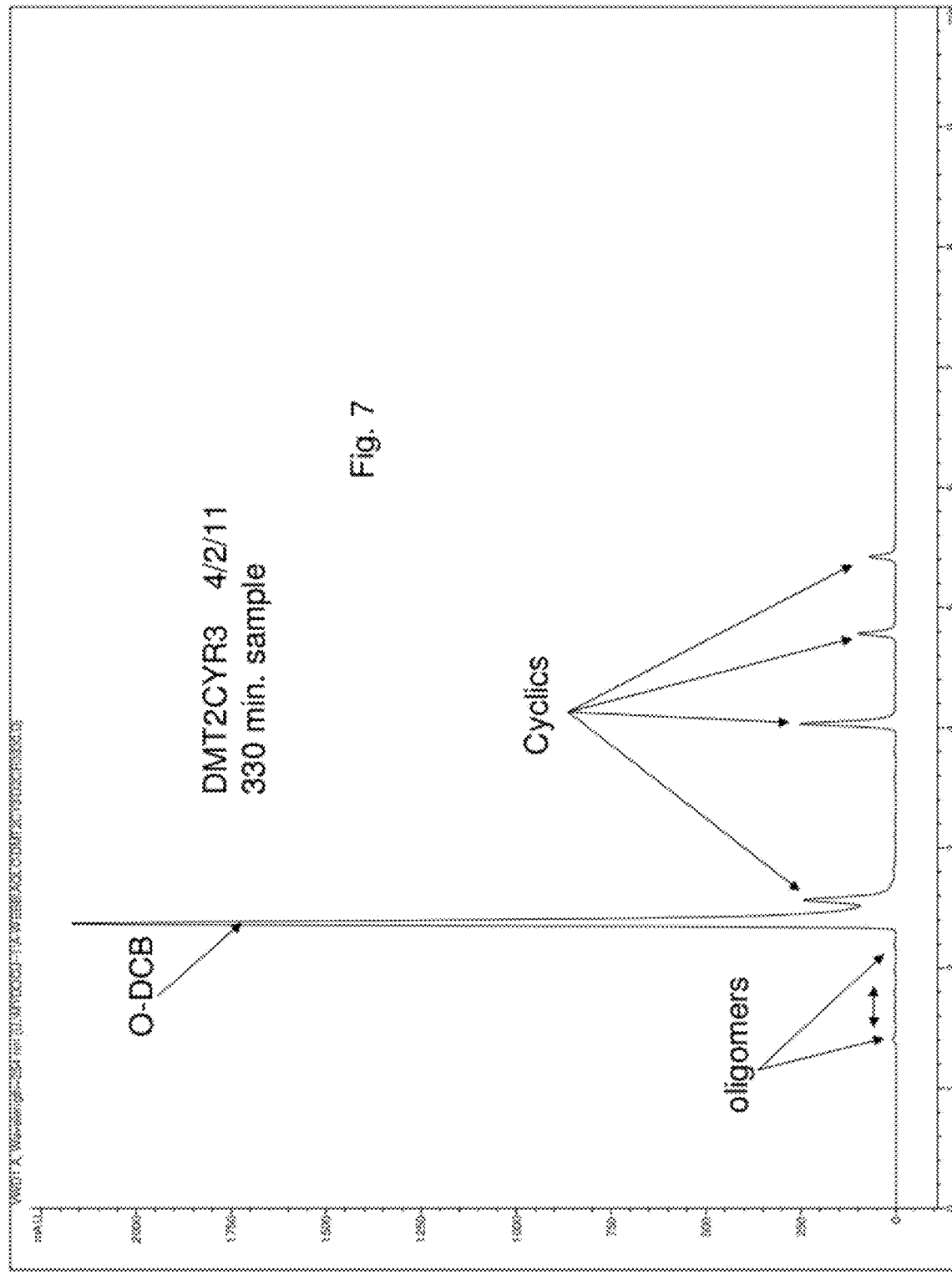
Figure 8:
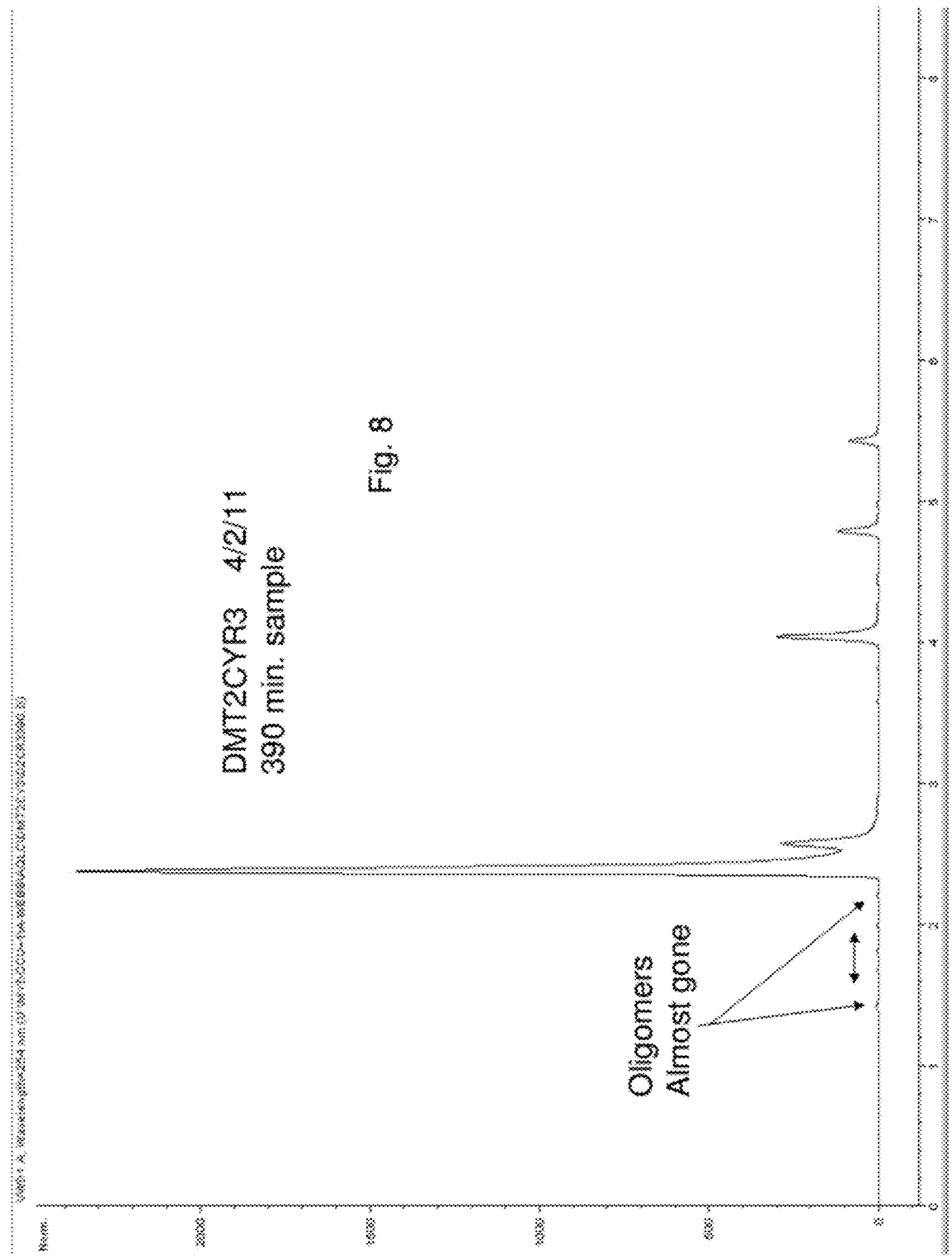
Figure 9:
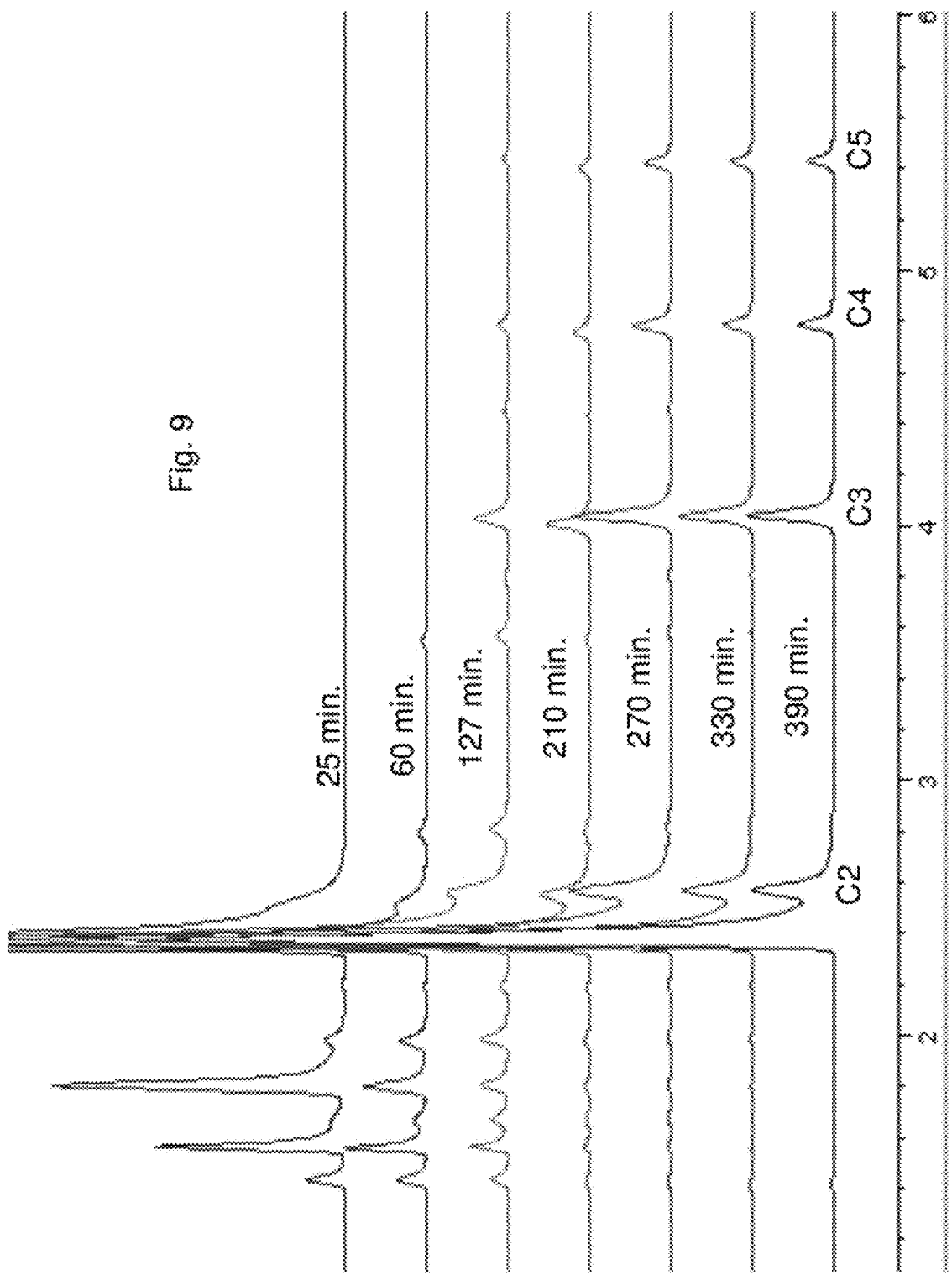
Figure 10:
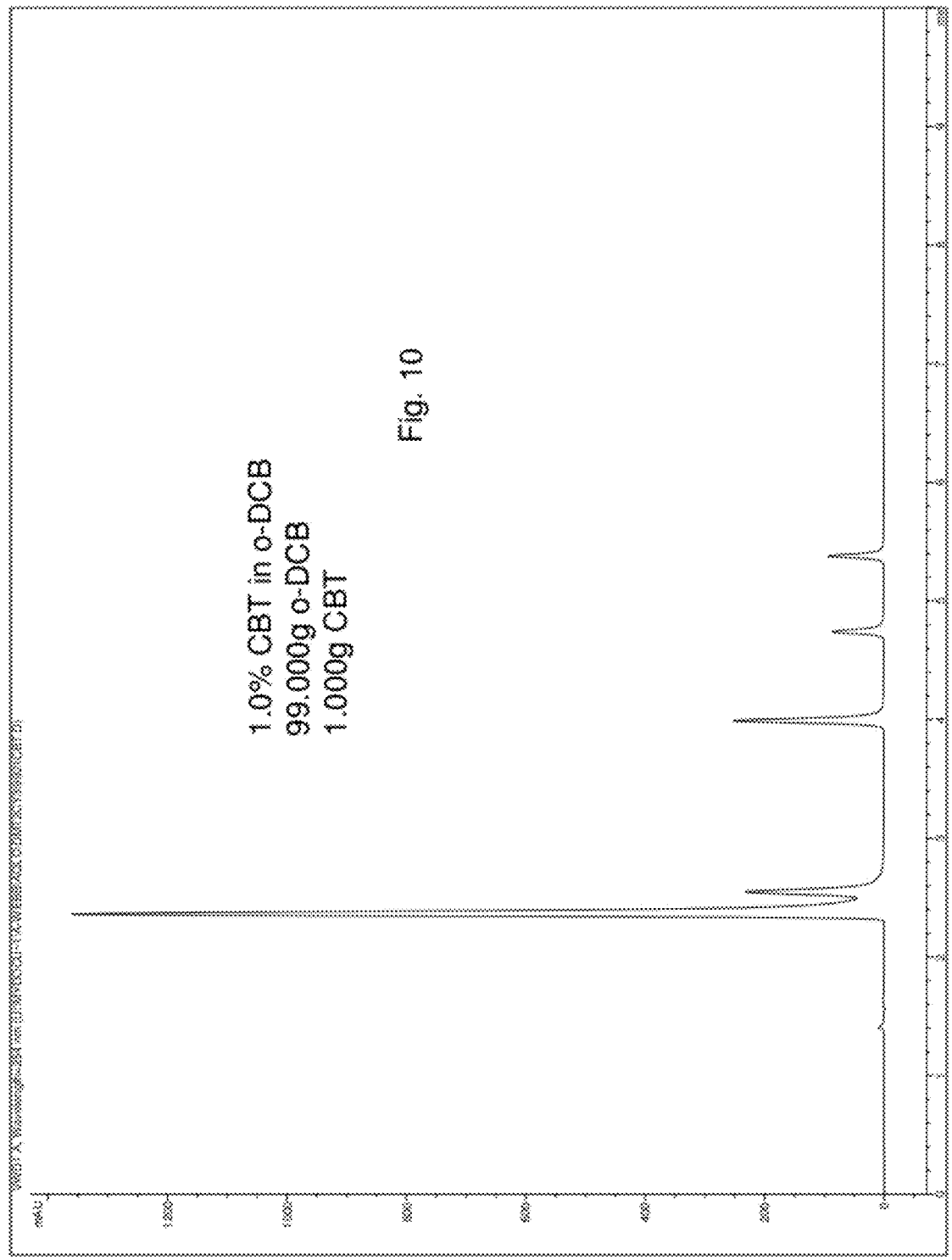
Figure 11:
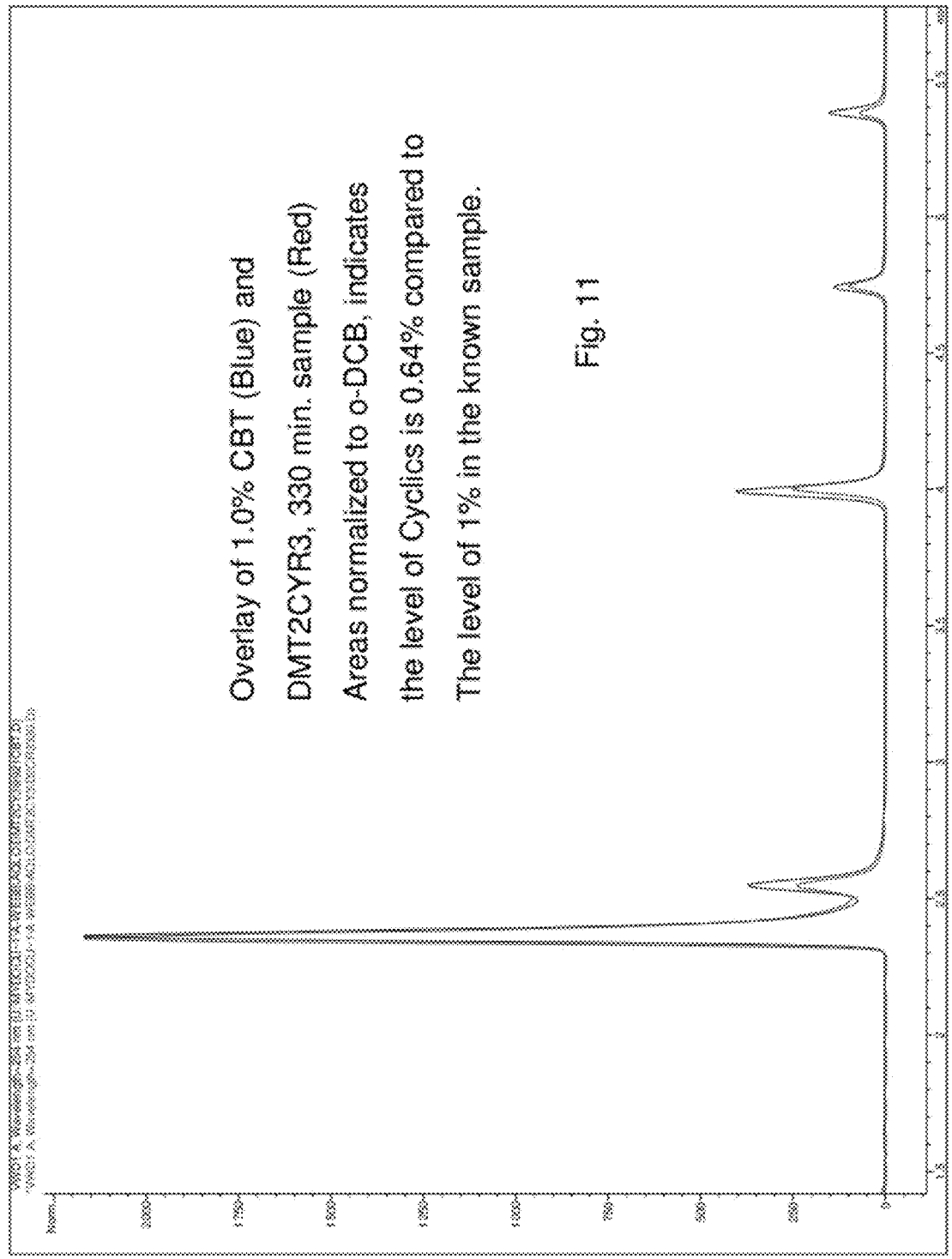
Figure 12:
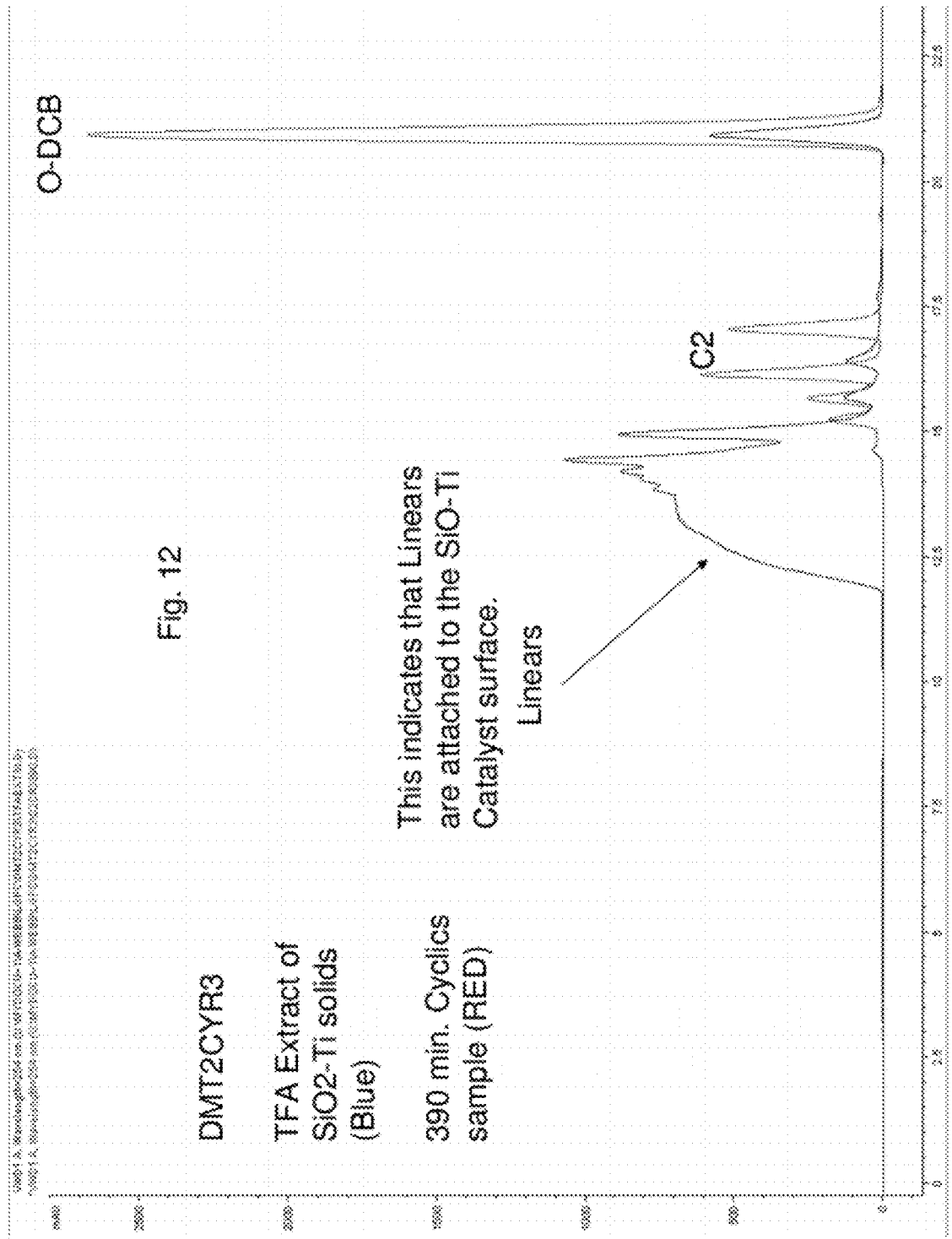
Figure 13:
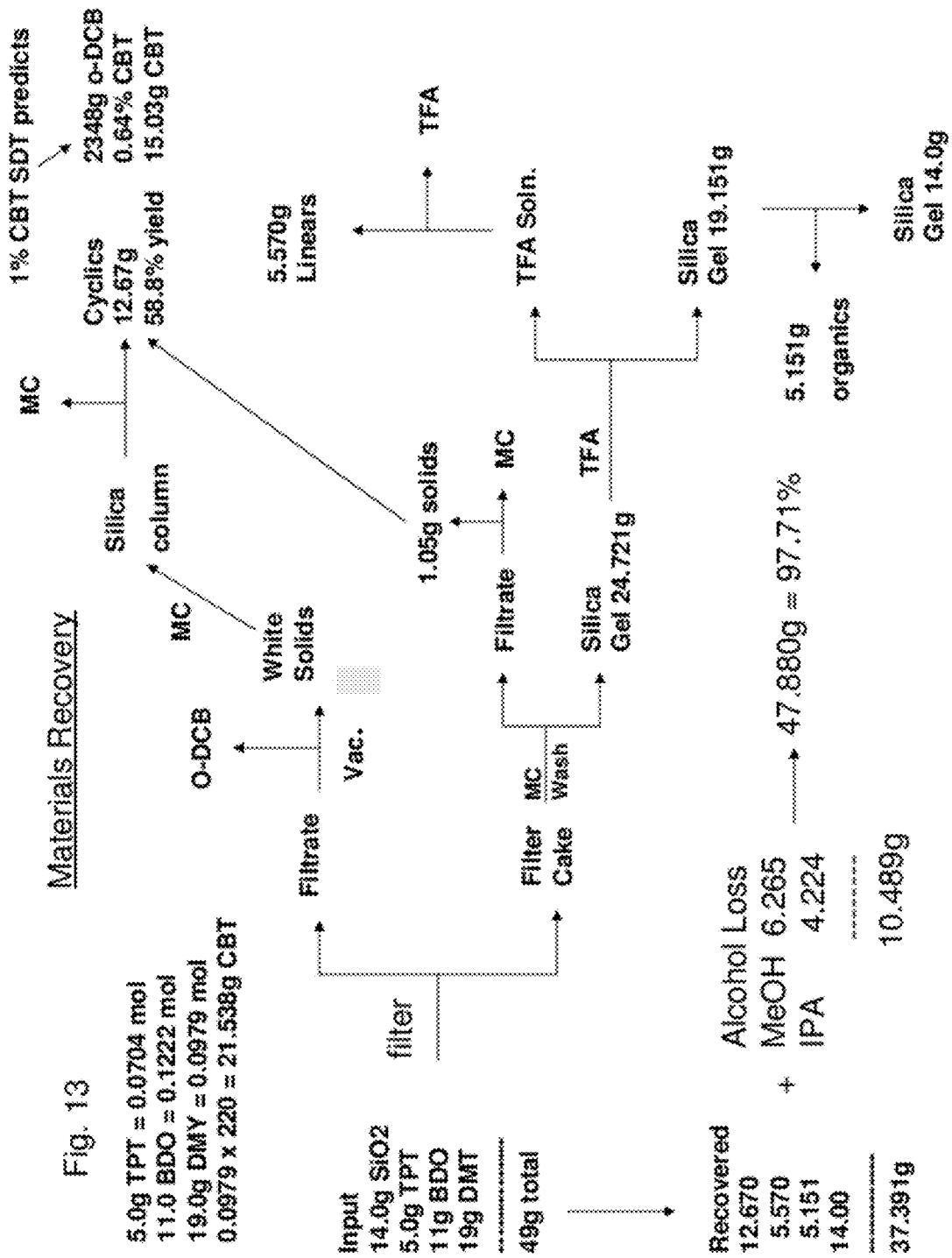
FIG. 13 is a flow diagram illustrating a materials recovery process, according to an illustrative embodiment of the invention.
Figure 14:
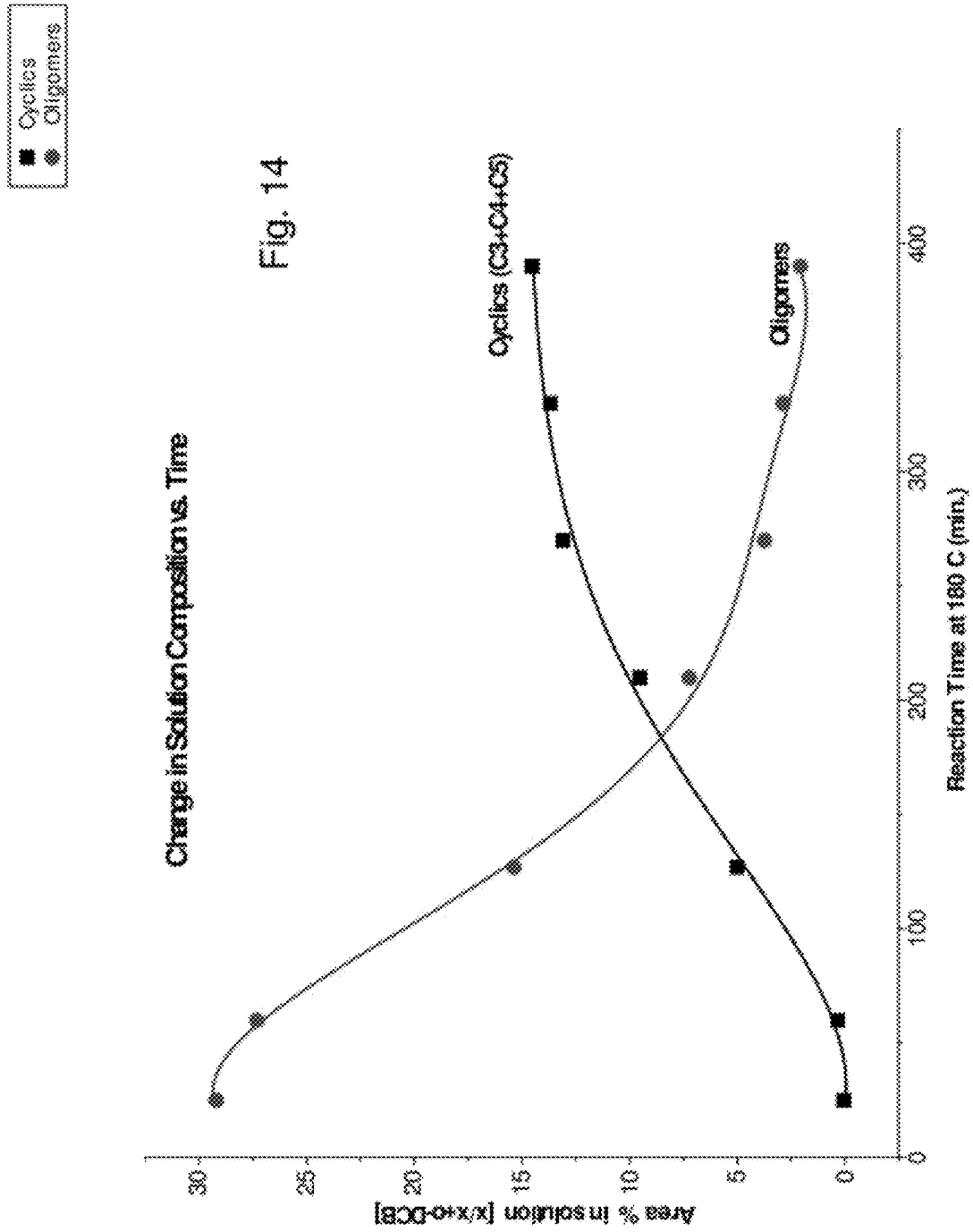
FIGS. 14 and 15 are plots showing reaction solution composition as a function of reaction time, according to an illustrative embodiment of the invention.
Figure 15:
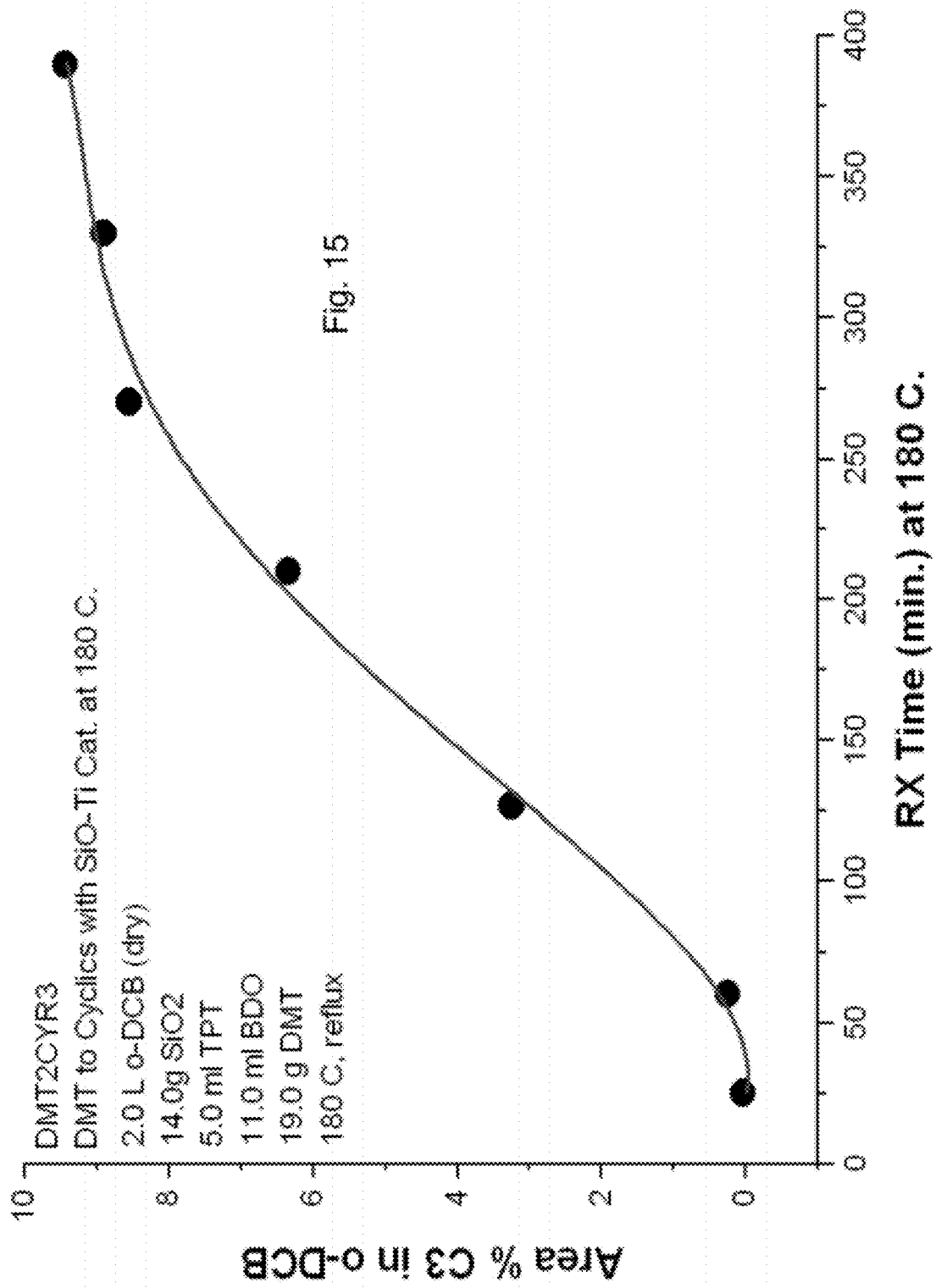

Throughout the description, where compositions, mixtures, blends, and composites are described as having, including, or comprising specific components, or where processes and methods are described as having, including, or comprising specific steps, it is contemplated that, additionally, there are compositions, mixtures, blends, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

Macrocyclic polyester oligomers that may be employed in this invention include, but are not limited to, macrocyclic poly(alkylene dicarboxylate) oligomers having a structural repeat unit of the formula:

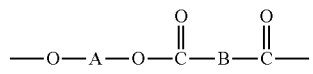

where A is an alkylene, or a cycloalkylene or a mono- or polyoxyalkylene group; and B is a divalent aromatic or alicyclic group.

Preferred macrocyclic polyester oligomers include macrocyclic poly(1,4-butylene terephthalate) (cPBT), macrocyclic poly(1,3-propylene terephthalate) (cPPT), macrocyclic poly (1,4-cyclohexylenedimethylene terephthalate) (cPCT), macrocyclic poly(ethylene terephthalate) (cPET), and macrocyclic poly(1,2-ethylene 2,6-naphthalenedicarboxylate) (cPEN) oligomers, and copolyester oligomers comprising two or more of the above monomer repeat units.

Methods of the invention may be used to produce macrocyclic homo- and co-polyester oligomers. In one embodiment, macrocyclic ester homo- and co-oligomers produced via methods of this invention include oligomers having a general structural repeat unit of the formula:

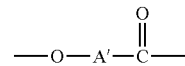

where A' is an alkylene, cycloalkylene, or mono- or polyoxyalkylene group, and where A' may be substituted, unsubstituted, branched, and/or linear. Example MPOs of this type include butyrolactone and caprolactone, where the degree of polymerization is one, and 2,5-dioxo-1,4-dioxane, and lactide, where degree of polymerization is two. The degree of polymerization may also be 3, 4, 5, or higher. Molecular structures of 2,5-dioxo-1,4-dioxane and lactide, respectively, appear below:

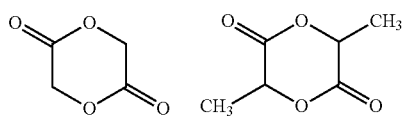

In general, a macrocyclic polyester oligomer (an MPO) produced via methods of the invention includes species of different degrees of polymerization, although, in certain embodiments, MPO with a high concentration of a particular species may be produced. Here, a degree of polymerization (DP) with respect to the MPO means the number of identifiable structural repeat units in the oligomeric backbone. The structural repeat units may have the same or different molecular structure. For example, an MPO may include dimer, trimer, tetramer, pentamer, and/or other species. In certain embodiments, the MPO is primarily (e.g., consists essentially of) dimer, trimer, tetramer, and/or pentamer species. In certain embodiments, the MPO is primarily (e.g., consists essentially of) trimer, tetramer, and/or pentamer species (e.g., C3+C4+C5).

Where methods of the invention refer to the use of a dialkyl terephthalate, such as DMT, those methods are also contemplated to include variations of the method in which terephthalic acid (TPA) is used instead of at least a portion of the dialkyl terephthalate. For example, it is contemplated that a method of the invention in which a reaction is performed using a dialkyl terephthalate and a diol inherently includes an adaptation in which terephthalic acid is used instead of (or in addition to) dialkyl terephthalate.

It is contemplated that methods, systems, and processes of the claimed invention encompass scale-ups, variations, and adaptations developed using information from the embodiments described herein. For example, the invention includes pilot plant and plant-scale manufacturing processes whose feasibility is demonstrated by the laboratory-scale experiments described herein. The chemical reactions described herein may be performed using reactor equipment that is known to those of ordinary skill in the field of polymer manufacturing and processing, including, without limitation, for example, batch reactors, plug-flow reactors, continuously-stirred tank reactors, packed-bed reactors, slurry reactors, fluidized bed reactors, and columns. Chemical reactions described herein may be conducted in batch, semi-continuous, and/or continuous operation.

Scale-up of systems from laboratory to plant scale may be performed by those of ordinary skill in the field of polymer manufacturing and processing. For example, those of ordinary skill in this field may select reactor types, design experiments for obtaining kinetic data, develop and apply models for reactor design, develop economically optimum reactor design, and/or validate reactor designs via pilot plant and/or full scale reactor experiments. General information regarding reactors and the design of reactor systems for manufacture of products may be found, for example, in "Kinetics and Reaction Engineering," John L. Falconer, editor, in *The Engineering Handbook*, Section X, Richard C. Dorf, editor-in-chief, CRC Press, Inc., ISBN 0-8493-8344-7, pp. 785-829 (1995).

Any suitable techniques for material separation, isolation, and purification may be adapted for application in manufacturing processes encompassed by various embodiments of the invention, for example, techniques for distillation, extraction, reactive extraction, adsorption, absorption, stripping, crystallization, evaporation, sublimation, diffusional separation, adsorptive bubble separation, membrane separation, and/or fluid-particle separation. General information regarding separation processes and their design may be found, for example, in "Separation Processes," Klaus Timmerhaus, editor, in *The Engineering Handbook*, Section VIII, Richard C. Dorf, editor-in-chief, CRC Press, Inc., ISBN 0-8493-8344-7, pp. 579-657 (1995).

It is also contemplated that methods, systems, and processes of the claimed invention may include pumps, heat exchangers, and gas-, liquid-, and/or solid-phase material handling equipment known to those of ordinary skill in the field of polymer manufacturing and processing.

Embodiments of the invention may be performed as part of a continuous, semi-continuous, or batch process. Reactors may be single-stage or multi-stage. It is contemplated that methods of the invention may be combined or supplemented with reactors, systems, or processes that are known in the art.

The mention herein of any publication, for example, in the Background section, is not an admission that the publication serves as prior art with respect to any of the claims presented herein. The Background section is presented for purposes of clarity and is not meant as a description of prior art with respect to any claim.

As used herein, "macrocyclic" is understood to mean a cyclic molecule having at least one ring within its molecular structure that contains 5 or more atoms covalently connected to form the ring.

As used herein, an "oligomer" is understood to mean a molecule that contains one or more identifiable structural repeat units of the same or different formula.

As used herein, "macrocyclic polyester oligomer" (MPO), or "cyclics", is understood to mean macrocyclic oligomer containing structural repeat units having an ester functionality. A macrocyclic polyester oligomer typically refers to multiple molecules of one specific repeat unit formula. However, a macrocyclic polyester oligomer also may include multiple molecules of different or mixed formulae having varying numbers of the same or different structural repeat units. Thus, the terms "macrocyclic polyester oligomer" and "macrocyclic polyester oligomers" (plural form) may be used interchangeably. Also, the terms "macrocyclic polyester oligomer" and "macrocyclic oligoester" are used interchangeably herein. A macrocyclic polyester oligomer may be a co-polyester or multi-component polyester oligomer, i.e., an oligomer having two or more different structural repeat units having ester functionality within one cyclic molecule.

As used herein, "substantially homo- or co-polyester oligomer" is understood to mean a polyester oligomer wherein the structural repeat units are substantially identical or substantially composed of two or more different structural repeat units, respectively. Unless otherwise noted, the polyester oligomers described herein include substantially homo-polyester oligomers as well as substantially co-polyester oligomers.

Various organic solvents may be used to practice the present invention. In some embodiments, the organic solvent may include at least one member selected from the group consisting of tetradecane, hexadecane, octadecane, toluene, xylene, trimethylbenzene, tetramethylbenzene, ethylbenzene, propylbenzene, naphthalene, methylnaphthalene, biphenyl, triphenyl, diphyenyl ether (or a halogenated derivative thereof), anisol, methylene chloride, dimethyoxybenzene, chlorobenzene, dichlorobenzene, trichlorobenzene, chloronaphthalene, dichloronaphthalene, and/or a perfluorocarbon. In particular embodiments, the organic solvent may include ortho-xylene. In other embodiments, the organic solvent may include ortho-dichlorobenzene. In some embodiments, the organic solvent may include an alkane, such as tetradecane and hexadecane. In other embodiments, the organic solvent may include a perfluorocompound, such as perfluoro(tri-n-butylamine) and perfluoro(tri-n-pentylamine).

Catalysts that may be used include known organotitanate compounds and organotin compounds, although other catalysts may be used. In certain embodiments, the catalyst may include an organotitanate, for example but without limitation, a member selected from the group consisting of 2-ethylhexyl titanate, tetrakis-(2-ethylhexyl) titanate, tetrabutyl titanate, tetraisopropyl titanate, an alkoxy titanate, titanium methoxide, titanium ethoxide, diisopropoxide bis(2,4-pentanedionate), and butanediol titanate.

Experimental Examples

MPO from DMT with a SiO2-Ti Solid Catalyst

Experiments were conducted to demonstrate preparation of cPBT directly from DMT and BDO via heterogeneous catalysis. The reaction set-up consisted of a 3 L three-necked flask fitted with an overhead stirrer, a sample port, a Dean Stark trap (boil up leg packed with stainless steel packing to assist separation), a vapor purge (a slow upward flow of $N_2$ through the condenser to push volatiles out overhead [see FIG. 1]), just above the Dean Stark trap, a Vigreux column on top of the vapor purge (o-DCB reflux never reached beyond the very bottom of the Vigreux column), a water cooled condenser on top of the Vigreux column, and a nitrogen bubbler on the outlet of the condenser. The whole system was kept under a slight nitrogen pressure. Water and o-DCB were removed from the bottom of collection leg of the Dean Stark trap.

Initially the 3 L flask was charged with 2250 ml of o-DCB and 14.0 g of silica gel. The head space was purged with $N_2$ and heat applied to the flask to bring it to reflux. Water was removed, followed by taking off 150 ml of o-DCB. With the system now dry, 5.0 ml of $Ti(OPr-i)_4$ was added. i-PrOH could be seen up in the Vigreux Column. After the i-PrOH was swept away, another 100 ml of o-DCB was removed.

The o-DCB at RT should now be 2.0 L. Then 11.0 ml of BDO was added. The vapor purge was continued for 30 min. (full return of overheads to pot) to remove any i-PrOH librated by the BDO. Then, 19.0 g of DMT was added. This was counted as reaction time zero. Samples were then removed every 5.0 min. for the first hour, then at 127, 210, 270, 330 and 390 min. Vapor purge was continued to remove MeOH.

FIGS. 2-12 show HPLC analysis of select samples. The 25 min. sample showed only oligomers coming off before o-DCB. At 60 min., small amounts of cyclics were observed. The growth of cyclics (MPO) continues with time and levels off at about 390 min. This clearly seen in the graph of the percent C3 in o-DCB. Comparing the area of cyclics to the area of o-DCB in a known 1% solution indicated 0.64% cyclics.

HPLC, GPC and LGPC all indicated no residual linears were detected in the filtered reaction mixture. The reaction mixture was filtered thru a Buchner funnel to collect the silica gel. The filter cake of silica gel was wash with $CH_2Cl_2$. The filtrate was stripped on a Rotovap at full pump vac. to yield 19 g of white solids.

BDO may be added before or after DMT. The amount of catalyst may be varied, and greater MPO conversion may be achieved than shown here. Reaction time may be reduced by running at a higher temperature. For example, performing the reaction at 180 C takes about 180 minutes; at 190 C, it should take about 90 minutes; at 200 C, it should take about 45 minutes; and at 210 C it should take about 22.5 minutes.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for preparing a macrocyclic polyester oligomer (MPO), the method comprising:
    (a) heating a mixture, the mixture comprising:
        (i) a diol;
        (ii) dimethylterephthalate (DMT) or, alternatively or additionally, a DMT precursor; and
        (iii) an organic solvent; and
    (b) contacting the mixture with a solid comprising a catalyst, thereby producing MPO.

2. The method of claim 1, further comprising removing alcohol produced.

3. The method of claim 2, wherein the alcohol is methanol.

4. The method of claim 1, wherein the heating and contacting steps are performed at the same time.

5. The method of claim 1, wherein the MPO is cyclic poly(butylene terephthalate) (cPBT).

6. The method of claim 1, wherein the mixture in step (a) comprises a DMT precursor, wherein the DMT precursor is terephthalic acid (TPA).

7. The method of claim 1, wherein the organic solvent is ortho-dichlorobenzene (oDCB).

8. The method of claim 1, wherein the solid comprising the catalyst is a member selected from the group comprising titanium catalyst-coated fiberglass, titanium catalyst-coated silica gel, and titanium catalyst-adhered magnetic iron oxide.

9. The method of claim 1, wherein the solid comprising the catalyst is packed in a column.

10. The method claim 1, wherein the solid comprising the catalyst is packed in a bed.

11. The method of claim 1, wherein the solid comprising the catalyst is loose in a reactor vessel.

12. The method of claim 1, wherein the contacting step is performed in the presence of heat.

13. The method of claim 1, wherein the MPO is a member selected from the group consisting of cPBT, cPPT, cPCT, cPET, and cPEN.

14. The method of claim 1, wherein the MPO is a copolymer oligomer.

15. The method of claim 1, further comprising collecting the MPO.

16. The method of claim 15, wherein the collected MPO is at least 80 wt. % dimer, trimer, tetramer, and/or pentamer species.

17. The method of claim 1, wherein the yield of MPO is at least 35%.

18. The method of claim 17, wherein the yield of MPO is at least 50%.

* * * * *